Sept. 9, 1969  W. FRANKE  3,465,728

COOLING SYSTEM FOR ROTARY PISTON ENGINES

Filed March 9, 1967  3 Sheets-Sheet 1

INVENTOR
Walter Franke by Michael J. Striker

Sept. 9, 1969  W. FRANKE  3,465,728
COOLING SYSTEM FOR ROTARY PISTON ENGINES
Filed March 9, 1967  3 Sheets-Sheet 3

INVENTOR
Walter Franke
BY
Michael J. Striker
ATTORNEY

United States Patent Office
3,465,728
Patented Sept. 9, 1969

3,465,728
COOLING SYSTEM FOR ROTARY PISTON ENGINES
Walter Franke, Maschen, District Harburg, Germany
Filed Mar. 9, 1967, Ser. No. 621,905
Int. Cl. F02b 53/00, 55/06
U.S. Cl. 123—8        15 Claims

ABSTRACT OF THE DISCLOSURE

A rotary piston internal combustion engine wherein a housing accommodates a rotary cylinder having a diametrically extending combustion chamber for a reciprocable hollow piston coupled to the housing in such a way that the cylinder rotates in response to reciprocation of the piston on repeated ignition of a fuel-air mixture in the combustion chamber. The cooling system of the engine comprises a compressor which is operated by the cylinder and supplies gaseous coolant through inlets provided in the housing and cylinder, such coolant flowing through the hollow piston and exchanging heat with combustion products. The thus preheated coolant can be evacuated into the atmosphere or, and provided the coolant is air, it is mixed with fuel in the combustion chamber to form a preheated combustible mixture. If the coolant is a fuel-air mixture, the engine can be operated without direct admission of pure fuel into the the combustion chamber.

BACKGROUND OF THE INVENTION

The present invention relates to rotary piston apparatus in general, and more particularly to improvements in rotary piston internal combustion engines of the type disclosed in my Patent No. 3,289,655 granted Dec. 6, 1966. Still more particularly, the invention relates to improvements in cooling systems for rotary piston internal combustion engines.

My aforementioned Patent No. 3,289,655 discloses a rotary piston apparatus which may be utilized as an internal combustion engine and comprises a fixed housing for a rotary cylinder. The cylinder has a diametrically extending chamber which receives a reciprocable piston, the latter being coupled to the housing in such a way that its reciprocation with reference to the cylinder causes the latter to rotate in the housing and to thereby drive an output shaft.

An object of the present invention is to provide a novel cooling system for all such parts of the rotary piston apparatus which exchange heat with combustion products when the apparatus is used as an internal combustion engine.

Another object of the invention is to provide an air cooling system which becomes effective in automatic response to reciprocation of the piston with reference to the cylinder.

A further object of the invention is to provide a cooling system which can reduce the temperature of the piston by cooling the piston from within.

An additional object of the invention is to provide a pneumatic cooling system which, in addition to its primary function, also serves as a means for preheating air prior to mixing of such air with fuel to form a combustible mixture.

An additional object of the invention is to provide novel sealing devices which can be used in and on the cylinder of the above outlined internal combustion engine.

SUMMARY OF THE INVENTION

One feature of my present invention resides in the provision of a rotary piston internal combustion engine which comprises a housing defining an internal space and having an inlet connected with the internal space, a cylinder rotatably received in the internal space and having a transversely or diametrically extending combustion chamber and two apertures which communicate with the combustion chamber and each of which sweeps along the inlet of the housing during each revolution of the cylinder, a hollow piston reciprocably received in the combustion chamber and being rotatable about an axis which is parallel with the cylinder axis to rotate the cylinder in the internal space in response to its reciprocation in the combustion chamber, a pair of window means provided in the piston in such a way that each thereof communicates with one of the apertures, and an air compressor or an analogous source of coolant for supplying atmospheric air or a mixture of fuel and air into the inlet of the housing whereby such coolant passes through one of the apertures, the two window means, the other aperture and into the internal space to cool the housing, the cylinder and the piston.

In accordance with a presently preferred embodiment of my invention, the coolant which exchanges heat with combustion products in the combustion chamber during flow through the piston is admitted into the combustion chamber so that it constitutes a preheated combustible mixture or the oxygen-containing fraction of such mixture. This improves the thermal efficiency of the engine.

The novel features which are considered as characteristic of the invention are set forth in particular in the appended claims. The improved rotary piston engine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
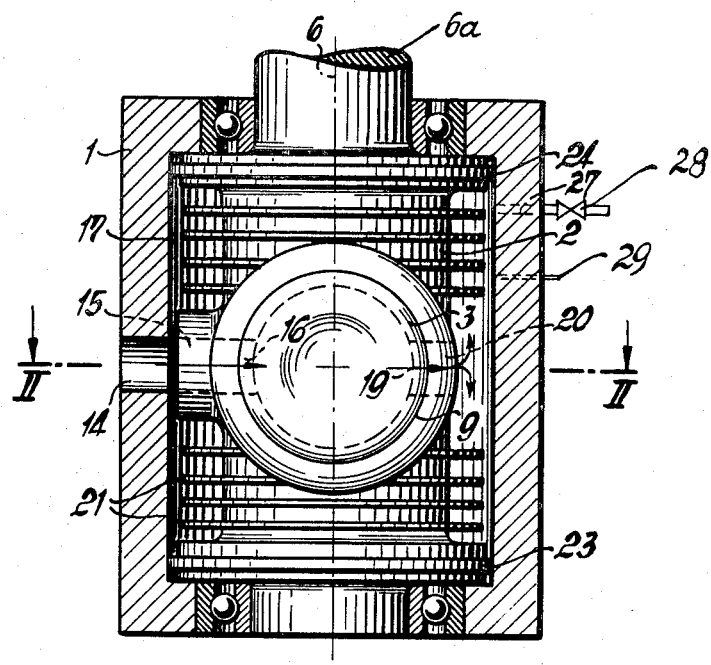
FIG. 1 is a side elevational view of a rotary piston internal combustion engine which embodies one form of my invention, the housing of the engine being shown in axial section.
Figure 2:
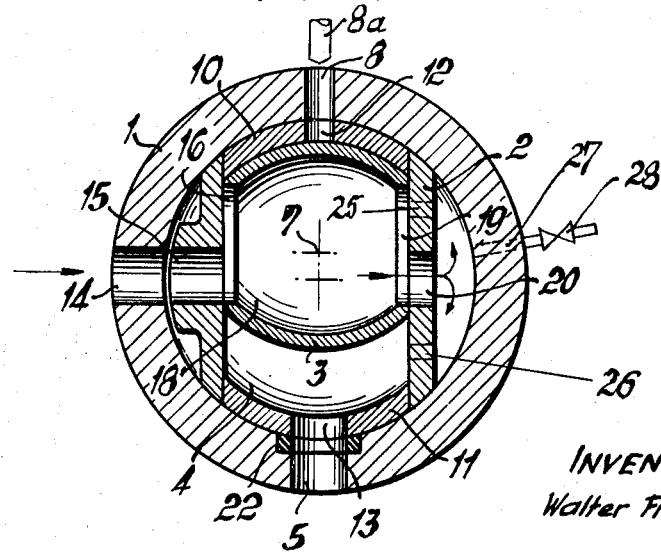
FIG. 2 is a horizontal section as seen in the direction of arrows from the line II—II of FIG. 1.

FIGS. 1 and 2 illustrate a rotary piston internal combustion engine which embodies one form of my invention. This engine comprises a stationary housing 1 defining a cylindrical internal space 17 for a cylinder 2 which is rotatable about an axis 6 and includes an output shaft 6a extending through a radial bearing in the top wall of the housing 1.

The lower end portion of the cylinder 2 constitutes a short stub shaft which is rotatable in a second radial bearing provided in the bottom wall of the housing 1. The cylinder 2 is further provided with a diametrically extending combustion chamber 4 bounded by a cylindrical surface 9 whose axis is normal to the axis 6. This chamber 4 receives a reciprocable piston 3 which is coupled with the housing 1 in such a way that, when it reciprocates in the axial direction of the combustion chamber 4, the cylinder 2 is automatically compelled to rotate about the axis 6 and to drive its shaft 6a. The piston 3 resembles a short cylinder with a pair of concavo-convex end walls. The manner in which the piston 3 can be coupled to the housing 1 is disclosed in my aforementioned Patent No. 3,289,655 and will be described in connection with FIGS. 4–6. The axis about which the piston 3 rotates with reference to the housing 1 is shown in FIG. 2 at 7, and such axis is parallel to the axis 6. The center of the piston 3 travels in a heart-shaped path when the engine of FIGS. 1 and 2 is in actual use.

In accordance with the present invention, the piston 3 is hollow and has two windows 16, 19 located diametrically opposite each other with reference to the axis 7. Otherwise stated, the windows 16, 19 are located at the opposite sides of a plane which includes the axes 6 and 7. The axial ends of the chamber 4 accommodate concavo-convex sealing members 10, 11 which are respectively provided with openings 12, 13. In the position shown in FIG. 2, the opening 12 registers with an outlet or exhaust opening 5 of the housing 1.

A fuel injection nozzle 8a admits into the inlet opening 8 a measured quantity of atomized fuel when the cylinder 2 assumes the angular position of FIG. 2. Such fuel is mixed with compressed air which fills the opening 12 of the sealing member 10 and the resulting fuel-air mixture is ignited (either automatically or by a spark furnished by a suitable igniter which is not shown) whereby the products of combustion tend to move the piston 3 toward the sealing member 11. Since the piston 3 is compelled to turn about the axis 7, the products of combustion cause the cylinder 2 to rotate about the axis 6 whereby the piston travels in the chamber 4 and the products of combustion are free to escape when the opening 12 begins to register with the outlet opening 5. At the same time, the opening 13 moves into registry with the inlet opening 8 and receives a fresh charge of atomized fuel from the nozzle 8a. The opening 13 is filled with fresh air before it moves out of registry with the outlet opening 5 and such air is compressed before the opening 13 reaches the inlet opening 8.

The housing 1 is provided with an inlet 14 which admits cooling air into a first aperture 15 of the cylinder 2 when the cylinder assumes the angular position of FIG. 2. Such air then flows through the window 16 and into the internal space 18 of the piston 3 to cool the piston and to be heated by combustion products in the chamber 4. The preheated air leaves through the window 19 and a second aperture 20 of the cylinder 2 to enter that portion of the space 17 which is not filled by the cylinder 2. The cylinder is provided with cooling fins or ribs 21 shown in FIG. 1 and is flattened in the region of its apertures 15, 20.

Figure 3:
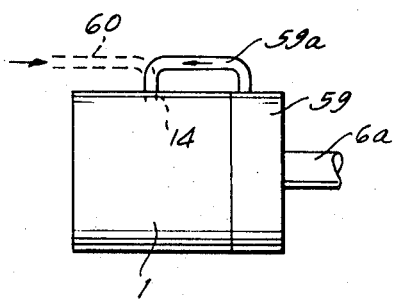
FIG. 3 is a smaller-scale elevational view of the engine, further showing a source of coolant which is driven by the output member of the cylinder to supply air which cools the cylinder and the piston.

The means for admitting coolant through the inlet 14 comprises a compresor 59 which is shown in FIG. 3 and is driven by the output shaft 6a of the cylinder 2. The pressure side of the compressor 59 is connected with a pipe 59a which discharges cooling air into the inlet 14 at a predetermined pressure. If desired, the inlet 14 can be further connected with a fuel supply pipe 60 (shown in FIG. 3 by broken lines) which can admit fuel to air issuing from the pipe 59a whereby the internal space 18 of the piston 3 receives a fuel-air mixture which is preheated prior to flowing via window 19, aperture 20, space 17 and a passage 25 or 26 into the chamber 4 of the cylinder 2. The pipe 60 may be provided in addition to or as a substitute for the injection nozzle 8a. The purpose of the sealing members 10, 11 is to prevent backfiring of flames on ignition of the fuel-air mixture. These sealing members preferably consist of elastically deformable material, for example, carbon, aluminum alloy, bronze or cast iron. Additional sealing members 23, 24 are recessed into circumferential grooves at the axial ends of the cylinder 2. These sealing members 23, 24 resemble piston rings. A sealing ring 22 is recessed into the housing 1 at the inner end of the outlet opening 5.

The housing 1 is further provided with a bore 27 which can be sealed by a thermostat valve 28. The thermostat is shown in FIG. 1 at 29. The valve 28 can regulate the outflow of surplus cooling air from the space 17 in dependency on the temperature in this space. Thus, the quantity of fresh air which enters via inlet 14 will be a function of the temperature in space 17 so that this space cannot be overheated because the valve 28 will allow for escape of air through the bore 27 if the temperature in space 17 rises beyond a predetermined value whereby the compressor 59 admits a greater amount of coolant to bring about rapid drop in temperature.

It is clear that the engine of FIGS. 1, 2 and 3 can be modified in a number of ways without departing from the spirit of my invention. For example, the compressor 59 can be replaced by a compressed-air tank or another suitable source of coolant.

The feature that the cooling air may be used as part of the fuel-air mixture in the cylinder chamber 4 improves the thermal efficiency of the engine. The piston 3 seals the passage 25 when the cylinder assumes the angular position of FIG. 2 so that preheated air flows only through the passage 26 and expels spent combustion products from the lower portion of the chamber 4, such products escaping through the opening 13 and outlet opening 5. When the cylinder 2 changes its angular position by 180 degrees, the piston 3 seals the passage 26 but exposes the passage 25. At such time, the flow of coolant is from the inlet 14, through aperture 20, window 19, window 16, aperture 15, space 17 and passage 25. During each revolution of the cylinder 2, its apertures 15, 20 sweep along the inlet 14 to admit fresh coolant into the internal space 18 of the piston 3. The windows 16, 19 are preferably of such length (as seen in the axial direction of the chamber 4) that each thereof remains in permanent communication with the respective aperture 15, 20.

Figure 4:
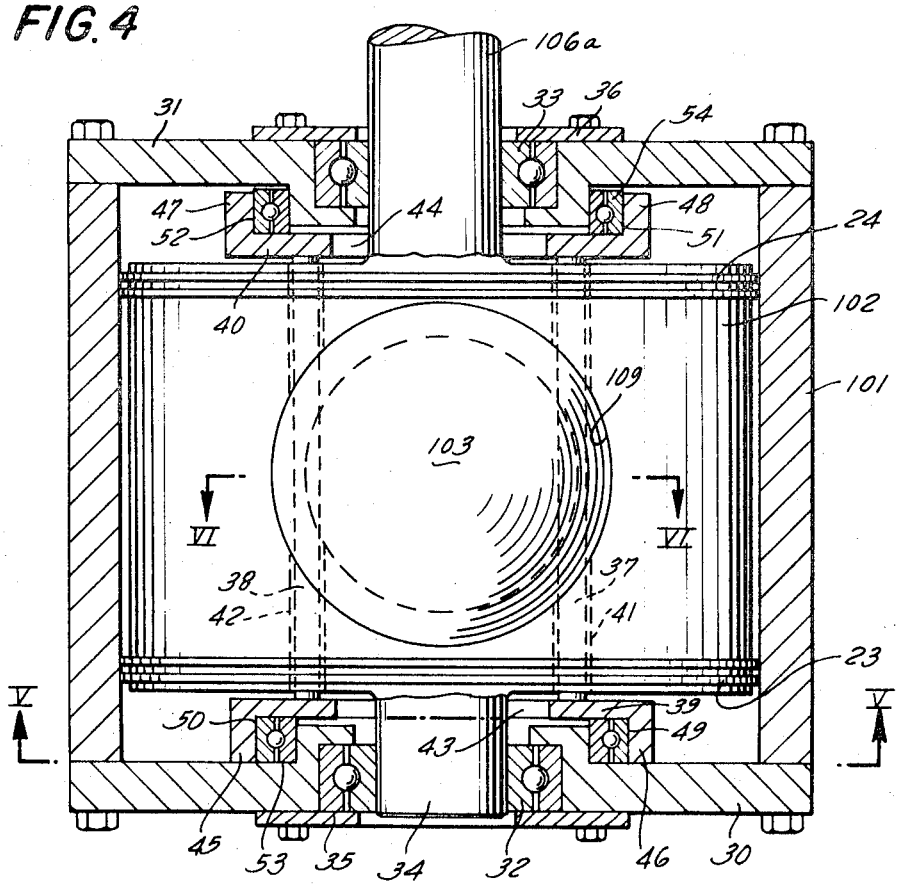
FIG. 4 is a side elevational view of a modified rotary piston internal combustion engine, the housing being shown in axial section.
Figure 5:
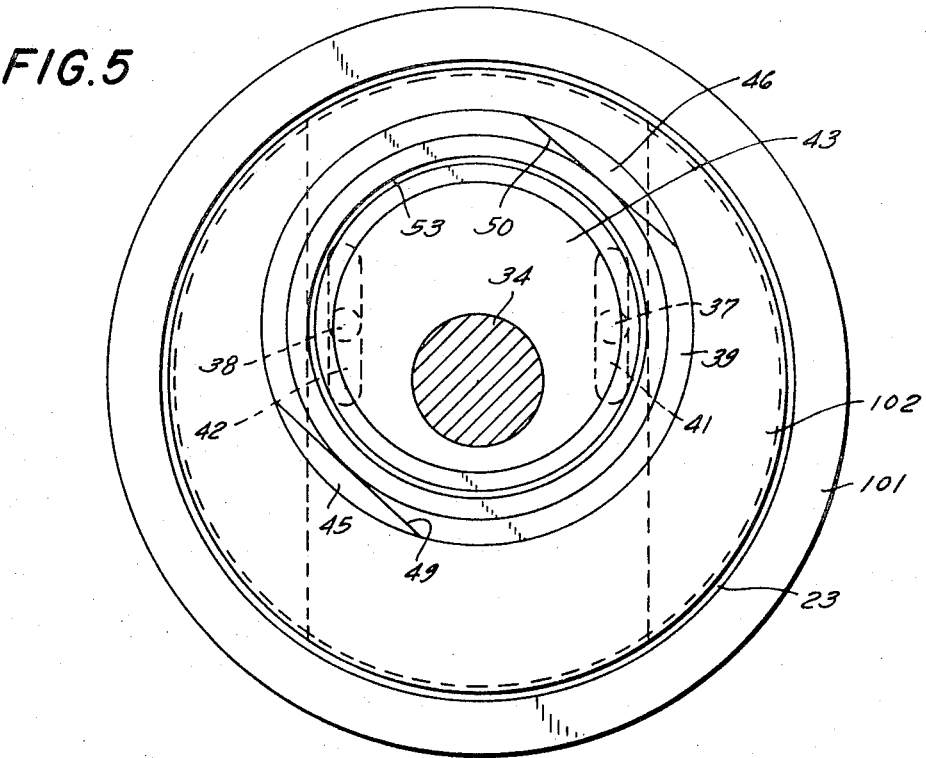
FIG. 5 is a horizontal section as seen in the direction of arrows from the line V—V of FIG. 4.
Figure 6:
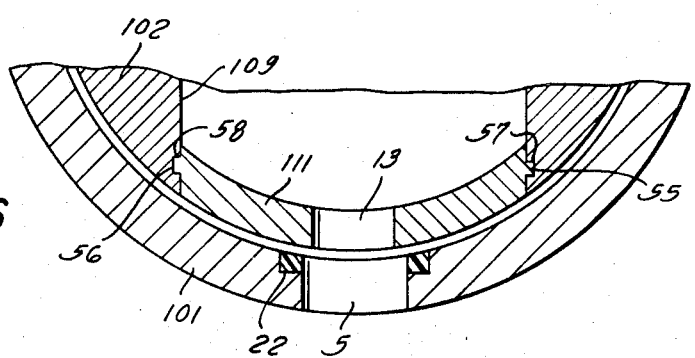
FIG. 6 is a fragmentary section as seen in the direction of arrows from the line VI—VI of FIG. 4.

FIGS. 4 to 6 show a modified rotary piston engine which includes a housing 101, a cylinder 102 and a piston 103. The output shaft 106a of the cylinder 102 is mounted in a radial bearing 33 installed in the upper end wall 31 of the housing 101. The lower end wall 30 of the housing 101 accommodates a second radial bearing 32 for the stub 34 of the cylinder 102. The opening in the end wall 30 is sealed by a disk 35 which is bolted to the housing 101. A ring 36 which is bolted to the top wall 31 overlies the bearing 33 and surrounds the output shaft 106a.

The piston 103 is reciprocable in the bore 109 of the cylinder 102 and carries bolts 37, 38 whose ends are connected with shoes 39, 40. The cylinder 102 is provided with elongated slots 41, 42 which receive portions of the rods 37, 38. The length of the slots 41, 42 exceeds somewhat the length of the piston strokes in the bore 109.

The shoes 39, 40 resemble disks which are provided with elongated cutouts 43, 44 for the stub 34 and output shaft 106a. In addition, the shoes 39, 40 respectively comprise pairs of projections of followers 45, 46 and 47, 48 which are located diametrically opposite each other and respectively comprise parallel faces 50, 49 and 52, 51. When the piston 103 rotates, the faces 49, 50 and 51, 52 respectively travel along the outer races of radial bearings 53, 54. The inner races of bearings 53, 54 are rigidly secured to the end walls 30, 31. The bolts 37, 38 travel in the slots 41, 42 when the cylinder 102 rotates. The center of the piston then travels in a heart-shaped path.

FIG. 6 shows that the sealing member 111 comprises tongues 55, 56 fitting into grooves 57, 58 of the cylinder 102. The sealing member (not shown) at the other axial end of the bore 109 is of similar configuration. All other reference numerals shown in FIGS. 4–6 but not specifically mentioned in the preceding description denote parts which were described in connection with FIGS. 1 and 2. The manner in which the housing 101, piston 103 and cylinder 102 are cooled is the same as described in connection with FIG. 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In an internal combustion engine, a combination comprising a housing defining an internal space and having an inlet connected with said space; a cylinder rotatably received in said space and having a transversely extending combustion chamber, said cylinder having two apertures communicating with said chamber and arranged to sweep along said inlet during each revolution of the cylinder; a hollow piston reciprocably received in said combustion chamber and rotatable about an axis which is parallel with the axis of said cylinder to rotate said cylinder in said space in response to its reciprocation in said combustion chamber, said piston having a pair of window means each of which registers with one of said apertures, at least when one of said apertures sweeps along said inlet; and means for supplying coolant to said inlet.

2. A combination as defined in claim 1, wherein said window means are in permanent communication with the respective apertures.

3. A combination as defined in claim 1, wherein said cylinder fills a portion of said internal space and wherein one of said window means discharges coolant into said internal space, and further comprising thermostat-controlled valve means for permitting evacuation of coolant from said space at a rate which is a function of changes in temperature in said housing.

4. A combination as defined in claim 1, further comprising annular sealing means interposed between said cylinder and said housing at the axial ends of said cylinder.

5. A combination as defined in claim 1, wherein said piston resembles a short cylinder with a pair of concavo-convex end walls.

6. A combination as defined in claim 1, wherein the coolant is air.

7. A combination as defined in claim 1, wherein the coolant is a mixture of fuel with oxygen.

8. A combination as defined in claim 1, wherein said cylinder is flattened in the region of said apertures.

9. In an internal combustion engine, a combination comprising a housing defining an internal space and having an inlet connected with said space; means for supplying coolant to said inlet; a cylinder rotatably received in said space and filling a portion thereof, said cylinder having a transversely extending combustion chamber and two apertures communicating with said chamber and arranged to sweep along said inlet during each revolution of the cylinder; a hollow piston reciprocably received in said combustion chamber and rotatable about an axis which is parallel with the axis of said cylinder to rotate said cylinder in said space in response to its reciprocation in said combustion chamber, said piston having a pair of window means each of which registers with one of said apertures, at least when one of said apertures sweeps along said inlet so that coolant may flow from said inlet through said one aperture and the one window means registering therewith into said hollow piston; and passage means in said cylinder for admitting coolant issuing from the other window means and flowing through the space into said combustion chamber.

10. In an internal combustion engine, a combination comprising a housing defining an internal space and having an inlet connected with said space; a cylinder rotatably received in said space and filling a portion thereof, said cylinder being provided with cooling fins extending into the remainder of said internal space, and said cylinder having a transversely extending combustion chamber and two apertures communicating with said chamber and arranged to sweep along said inlet during each revolution of the cylinder; a hollow piston reciprocably received in said combustion chamber and rotatable about an axis which is parallel with the axis of said cylinder to rotate said cylinder in said space in response to its reciprocation in said combustion chamber, said piston having a pair of window means each of which registers with one of said apertures, at least when one of said apertures sweeps along said inlet; and means for supplying coolant to said inlet.

11. In an internal combustion engine, a combination comprising a housing defining an internal space and having an inlet connected with said space; a cylinder rotatably received in said space and having a transversely extending combustion chamber, said cylinder having two apertures communicating with said chamber and arranged to sweep along said inlet during each revolution of the cylinder; a hollow piston reciprocably received in said combustion chamber and rotatable about an axis which is parallel with the axis of said cylinder to rotate said cylinder in said space in response to its reciprocation in said combustion chamber, said piston having a pair of window means each of which registers with one of said apertures, at least when one of said apertures sweeps along said inlet; means for supplying coolant to said inlet; and coupling means for rotating said cylinder in said housing in response to reciprocation of said piston in said combustion chamber, said coupling means comprising at least one elongated member connected with said piston and extending through an elongated slot provided in said cylinder, said elongated member having a shoe guided by said housing.

12. A combination as defined in claim 11, wherein said cylinder comprises an axially extending shaft and said shoe is provided with a cutout receiving said shaft.

13. A combination as defined in claim 12, wherein said shoe comprises a pair of followers and said housing is provided with a radial bearing coaxial with said cylinder and having an outer race which is tracked by said followers.

14. In an internal combustion engine, a combination comprising a housing defining an internal space and having an inlet connected with said space; a cylinder rotatably received in said space and having a transversely extending combustion chamber, said cylinder having two apertures communicating with said chamber and arranged to sweep along said inlet during each revolution of the cylinder; a hollow piston reciprocably received in said combustion chamber and rotatable about an axis which is parallel with the axis of said cylinder to rotate said cylinder in said space in response to its reciprocation in said combustion chamber, said piston having a pair of window means each of which registers with one of said apertures, at least when one of said apertures sweeps along said inlet; apertured sealing members accommodated in the ends of said combustion chamber at the opposite sides of said piston, the material of said sealing members is elastic and is selected from the group consisting of carbon, aluminum alloys, bronze and cast iron; and means for supplying coolant to said inlet.

15. In an internal combustion engine, a combination comprising a housing defining an internal space and having an inlet connected with said space; a cylinder rotatably received in said space and comprising an output member, said cylinder having a transversely extending combustion chamber and two apertures communicating with said chamber and arranged to sweep along said inlet during each revolution of the cylinder; a hollow piston reciprocably received in said combustion chamber and rotatable about an axis which is parallel with the axis of said cylinder to rotate said cylinder in said space in response to its reciprocation in said combustion chamber, said piston having a pair of window means each of which registers with one of said apertures, at least when one of said apertures sweeps along said inlet; and means for supplying coolant to said inlet and comprising an air compressor driven by said output member.

References Cited

UNITED STATES PATENTS

| | | | |
|---|---|---|---|
| 1,463,644 | 7/1923 | Winton | 123—41.39 |
| 3,112,870 | 12/1963 | Bentele | 123—8 X |
| 3,200,797 | 8/1965 | Dillenberg | 123—44 X |
| 3,279,445 | 10/1966 | Karol | 123—44 |
| 3,373,722 | 3/1968 | Zimmermann et al. | 123—8 |

WILLIAM E. WAYNER, Primary Examiner

U.S. Cl. X.R.

91—68; 123—43